United States Patent
Yoshida et al.

(10) Patent No.: US 10,730,461 B2
(45) Date of Patent: Aug. 4, 2020

(54) VEHICLE FRONT BODY STRUCTURE

(71) Applicant: TOYOTA JIDOSHA KABUSHIKI KAISHA, Toyota-shi, Aichi-ken (JP)

(72) Inventors: Eiji Yoshida, Seto (JP); Yasuhiko Katsumata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 16/185,877

(22) Filed: Nov. 9, 2018

(65) Prior Publication Data

US 2019/0161037 A1    May 30, 2019

(30) Foreign Application Priority Data

Nov. 24, 2017    (JP) ................. 2017-225673

(51) Int. Cl.
| | |
|---|---|
| *B60R 19/18* | (2006.01) |
| *B60R 19/34* | (2006.01) |
| *B62D 21/15* | (2006.01) |
| *B60R 19/02* | (2006.01) |
| *B62D 21/02* | (2006.01) |

(52) U.S. Cl.
CPC ............ *B60R 19/023* (2013.01); *B60R 19/18* (2013.01); *B60R 19/34* (2013.01); *B62D 21/02* (2013.01); *B62D 21/152* (2013.01); *B60R 2019/186* (2013.01); *B60R 2019/1813* (2013.01)

(58) Field of Classification Search
CPC ....... B60R 19/34; B60R 19/18; B60R 19/023; B60R 2019/1813; B60R 2019/186; B60R 2021/0023; B62D 21/152; B62D 25/08; B62D 25/082

USPC ...................... 293/102; 296/187.09
See application file for complete search history.

(56) References Cited

U.S. PATENT DOCUMENTS

| | | | | |
|---|---|---|---|---|
| 7,896,408 | B2 * | 3/2011 | Hashimoto | B60R 19/24 |
| | | | | 293/102 |
| 9,457,746 | B1 * | 10/2016 | Baccouche | B60R 19/34 |
| 9,527,463 | B2 * | 12/2016 | Ramoutar | B60R 19/16 |
| 2006/0284432 | A1 * | 12/2006 | Hashimoto | B21D 39/06 |
| | | | | 293/154 |
| 2008/0217934 | A1 * | 9/2008 | Hori | B60R 19/18 |
| | | | | 293/102 |

(Continued)

FOREIGN PATENT DOCUMENTS

| | | |
|---|---|---|
| DE | 102013007263 A1 | 11/2014 |
| JP | 2014-113894 A | 6/2014 |

*Primary Examiner* — Gregory A Blankenship
(74) *Attorney, Agent, or Firm* — Oliff PLC

(57) ABSTRACT

A vehicle front structure includes a pair of side rails extending in a vehicle forward-rearward direction on right and left sides in a front portion of the vehicle and a hollow bumper reinforcement extending in a vehicle right-left direction and coupled to front ends of the pair of side rails. The bumper reinforcement includes side extension parts extending outward beyond the side rails, respectively. The vehicle front structure further includes load transmission members each extending from a front face of each of the side extension part of the bumper reinforcement through the side extension part and further extending rearward and toward the inward of the vehicle. In a small overlap crash, the load transmission member transmits a collision load directly to the side rail.

4 Claims, 3 Drawing Sheets

(56) References Cited

U.S. PATENT DOCUMENTS

| | | | | |
|---|---|---|---|---|
| 2010/0289330 A1* | 11/2010 | Uchida | ................ | H02M 3/158 |
| | | | | 307/9.1 |
| 2012/0267908 A1* | 10/2012 | Kokubo | ................ | B60R 19/34 |
| | | | | 293/133 |
| 2014/0062106 A1* | 3/2014 | Han | ................ | B60R 19/34 |
| | | | | 293/133 |
| 2015/0115633 A1* | 4/2015 | Braunbeck | ............ | B60R 19/04 |
| | | | | 293/132 |
| 2015/0274209 A1* | 10/2015 | Basappa | ................ | B60R 19/26 |
| | | | | 180/271 |
| 2015/0298634 A1* | 10/2015 | Hara | ................ | B60R 19/34 |
| | | | | 293/133 |
| 2016/0039376 A1* | 2/2016 | Narita | ................ | B60R 19/483 |
| | | | | 293/4 |
| 2016/0101751 A1* | 4/2016 | Bou | ................ | B62D 21/152 |
| | | | | 293/133 |
| 2016/0318469 A1* | 11/2016 | Matsumoto | ............ | B60R 19/34 |
| 2017/0106909 A1* | 4/2017 | Daido | ................ | B60R 19/02 |
| 2017/0274851 A1* | 9/2017 | Schneider | ............ | B60R 19/18 |
| 2018/0361965 A1* | 12/2018 | Hadano | ................ | B60R 19/18 |
| 2019/0161037 A1* | 5/2019 | Yoshida | ................ | B60R 19/023 |
| 2019/0256021 A1* | 8/2019 | Zierer | ................ | B60R 19/34 |
| 2019/0299889 A1* | 10/2019 | Wada | ................ | B62D 21/152 |

* cited by examiner

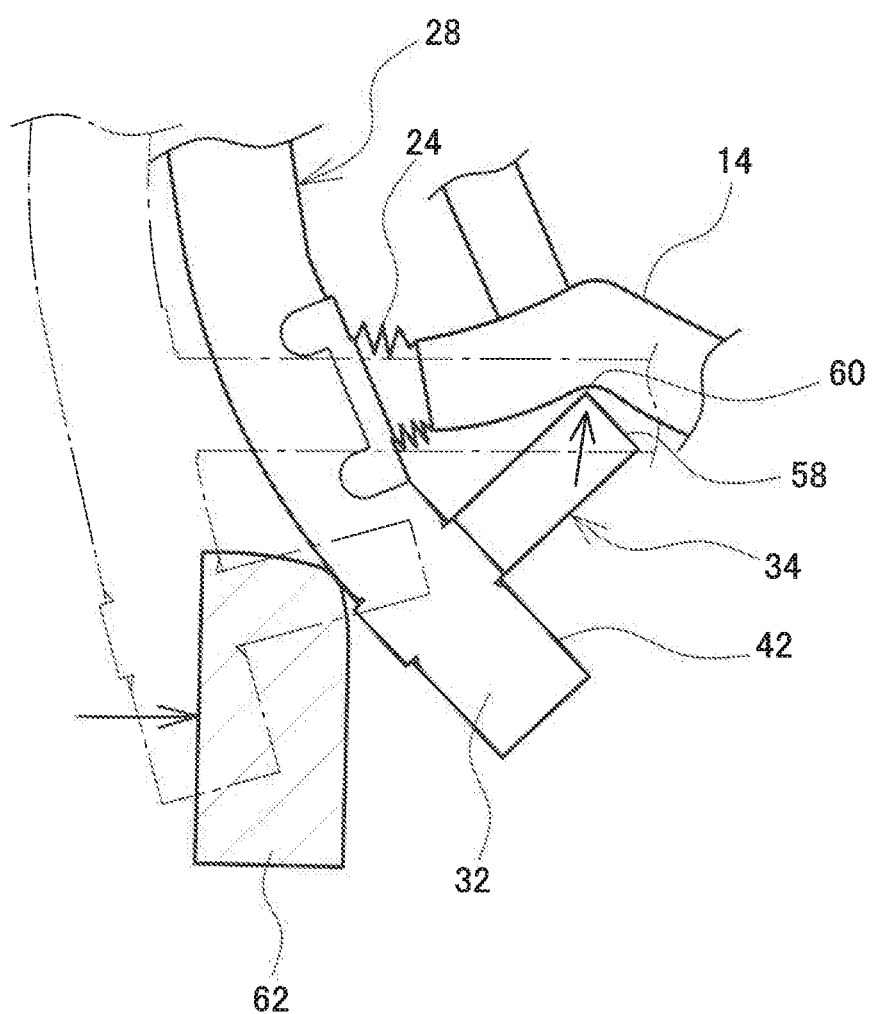

VEHICLE FRONT BODY STRUCTURE

CROSS REFERENCE TO RELATED APPLICATION

The disclosure of Japanese Patent Application No. 2017-225673 filed on Nov. 24, 2017 including the specification, claims, drawings, and abstract is incorporated herein by reference in its entirety.

TECHNICAL FIELD

The present disclosure relates to a front body structure of a vehicle, and more particularly to a structure designed to absorb impact.

BACKGROUND

A front body structure of a vehicle includes a pair of side frame members extending in a forward-rearward direction of the vehicle on right and left sides of the body, and a bumper reinforcement extending in a right-left direction of the vehicle and coupled to the respective front ends of the pair of side frame members. The bumper reinforcement includes side extension parts respectively extending outward beyond the pair of side frame members. The front body structure further includes load transmission members extending inward of the vehicle from the respective side extension parts to transmit a collision load to a side face of the side frame member in a small overlap crash; that is, when a collision object collides against the side extension part.

Patent Document 1 listed below discloses load transmission members (slide spacers 30) coupled to rear surfaces of the respective side extension parts (protrusive parts 20) of a bumper reinforcement (18) by means of front fixing parts (34). The members and reference numerals described above in parentheses are used in Patent Document 1 and are not relevant to the members and reference numerals used in the embodiment of the present application.

CITATION LIST

Patent Literature

[Patent Document 1] JP 2014-113894 A

SUMMARY

Technical Problem

In a front body structure including a bumper reinforcement formed of a hollow member and load transmission members coupled to the rear surface of the bumper reinforcement, a load acting on the side extension parts causes the bumper reinforcement to collapse and deform, which may prevent sufficient transmission of the collision load to the side frame members.

An embodiment of the present disclosure is directed toward providing a front body structure of a vehicle configured to transmit a collision load imposed on the side extension part efficiently to the side frame member via the load transmission member.

Solution to Problem

In accordance with an aspect of the disclosure, a front body structure of a vehicle includes a pair of side frame members, a hollow bumper reinforcement, and load transmission members. The pair of side frame members extend in a forward-rearward direction of the vehicle on right and left sides in a front portion of the vehicle, respectively. The hollow bumper reinforcement extends in a right-left direction of the vehicle and is coupled to front ends of the pair of side frame members. The bumper reinforcement includes side extension parts extending outward beyond the pair of side frame members, respectively. The load transmission members extend from front faces of the respective side extension parts of the bumper reinforcement through the side extension parts and further extend rearward and inward of the vehicle.

The load transmission member disposed through the bumper reinforcement allows a collision object to directly collide against the load transmission member and thus transmits the collision load directly to the side frame member in a small overlap crash.

The bumper reinforcement may include an upper wall, a lower wall, a front wall, and a rear wall forming a hollow quadrilateral cross section. The bumper reinforcement may further include at least one reinforcing wall disposed between the upper wall and the lower wall and connecting the front wall and the rear wall. The load transmission member may be disposed between two adjacent walls among the upper wall, the lower wall, and the at least one reinforcing wall of the bumper reinforcement.

The bumper reinforcement through which the load transmission member extends still allows the reinforcing wall to be disposed therein. This structure maintains strength and rigidity of the bumper reinforcement.

The load transmission member is a hollow member including an upper wall and a lower wall. The upper wall and the lower wall of the load transmission member may be respectively disposed in parallel to and adjacent to corresponding ones of the adjacent walls of the bumper reinforcement.

The load transmission member, which is disposed between the walls of the bumper reinforcement, is prevented from moving upward and downward with respect to the bumper reinforcement.

The bumper reinforcement and the load transmission members may comprise metal. At least the upper wall and the lower wall of the load transmission member are welded to the bumper reinforcement in the front face and a rear face of the bumper reinforcement.

The load transmission member is coupled to the bumper reinforcement by welding the upper wall and the lower wall of the load transmission member to the walls of the bumper reinforcement having high strength. This structure increases the coupling strength between the load transmission member and the bumper reinforcement.

The load transmission member includes a rear end spaced from the side frame member, and in a small overlap crash, the rear end of the load transmission member comes into contact with the side frame member, so that the load transmission member transmits a load input to the side extension part of the bumper reinforcement to the side frame member.

Advantageous Effects of Invention

The load transmission member transmits the load imposed in a small overlap crash directly to the side frame member, thereby increasing transmission efficiency of the collision load.

BRIEF DESCRIPTION OF DRAWINGS

An embodiment of the present disclosure will be described by reference to the following figures, wherein:

FIG. 5 is a diagram schematically illustrating deformation of the front body structure in a small overlap crash.

DESCRIPTION OF EMBODIMENTS

Figure 1:
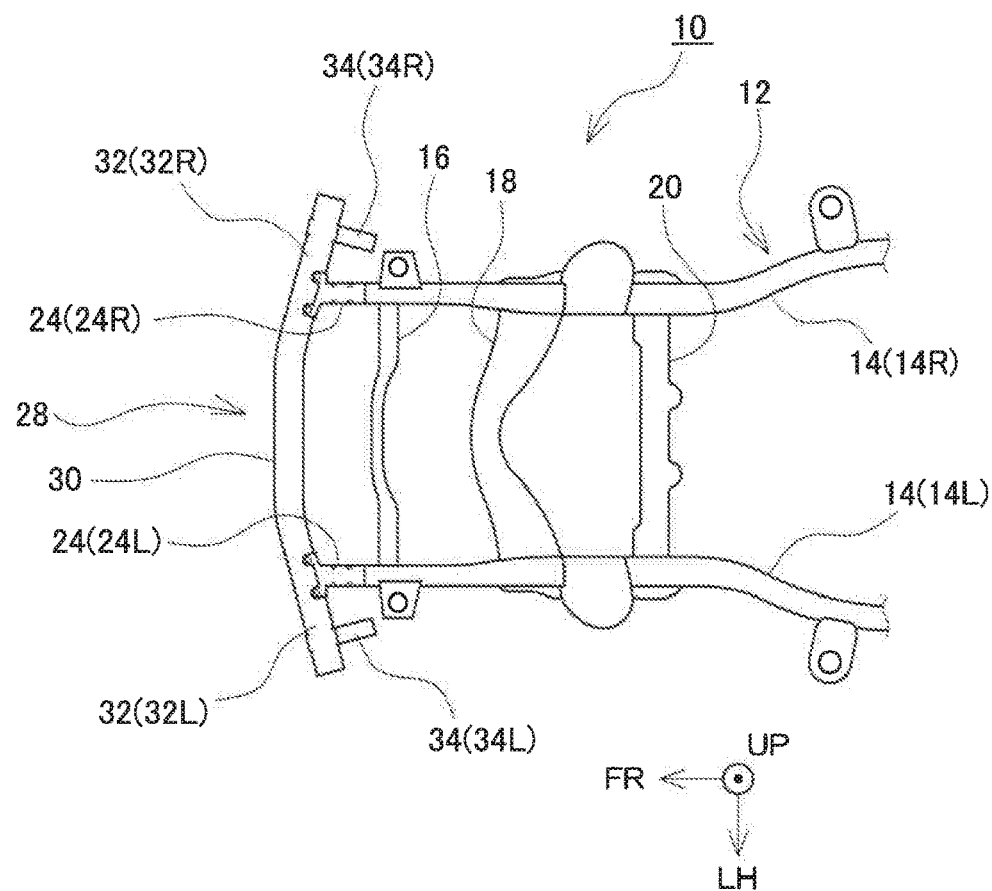
FIG. 1 is a plan view schematically illustrating a front body structure of a vehicle.

An embodiment of the present disclosure will be described with reference to the drawings. FIG. 1 is a plan view schematically illustrating a front body structure 10 of a vehicle. In the drawings, the direction indicated by an arrow FR corresponds to the forward direction of a vehicle; the direction indicated by an arrow LH corresponds to the leftward direction of the vehicle; and the direction going through the sheet toward the viewer (indicated by UP) corresponds to the upward direction of the vehicle. In the following description, unless otherwise specified, the terms expressing the directions and orientations, such as front (forward), rear (rearward), left (leftward), right (rightward), upper (upward), and lower (downward), for example, refer to the directions and orientations with respect to a vehicle. In the right-left direction, an area toward the center line of the vehicle will be referred to as inward of the vehicle and an area away from the vehicle will be referred to as outward of the vehicle.

The front body structure 10 of a vehicle includes a ladder frame 12. The ladder frame 12 includes a pair of side rails 14L and 14R extending in the front-rear direction on right and left sides of the vehicle, respectively, and a plurality of cross members 16, 18, and 20, extending in the right-left direction for coupling the right and left side rails 14L and 14R. Front portions of the side rails 14L and 14R are side frame members extending in the forward-rearward direction on right and left sides of the vehicle, respectively, in the front portion of the vehicle. The side rails 14L and 14R, including steel, have a hollow rectangular cross section. Front end portions of the respective side rails 14L and 14R are formed as crush boxes 24L and 24R having a lower strength than the portions behind them. The crush boxes 24L and 24R would collapse to reduce the impact in a forward crash.

A bumper reinforcement 28 extending in the right-left direction is coupled to the front ends of the side rails 14L and 14R. The bumper reinforcement 28 includes a center part 30 located between the right and left side rails 14L and 14R, and side extension parts 32L and 32R respectively extending outward in the right-left direction from both ends of the center part 30. The bumper reinforcement 28 has a bent or curved shape protruding forward as illustrated, such that the side extension parts 32L and 32R each have an outer end inclined to be disposed further rearward than its inner end connected to the center part 30.

The front body structure 10 further includes load transmission members 34L and 34R coupled to the bumper reinforcement 28. The load transmission members 34L and 34R extend rearward and inward of the vehicle from the respective ends of the bumper reinforcement 28; that is, from the respective side extension parts 32. In a small overlap crash, in which an object collides with an outer part of the vehicle corresponding to one-fourth of the vehicle width, the load transmission members 34L and 34R transmit a load generated in the crash to the side rails 14L and 14R, respectively. The load transmission members 34L and 34R will be described in further detail below.

The side rails 14L and 14R, the crush boxes 24L and 24R, the side extension parts 32L and 32R, and the load transmission members 34L and 34R are disposed in pairs symmetrically in the right-left direction, and each pair of elements has a symmetrical configuration. In the following description, these pairs of elements will be referred to simply as the side rail 14, the crush box 24, the side extension part 32, and the load transmission member 34, unless right and left elements need to be discriminated from each other.

Figure 2:
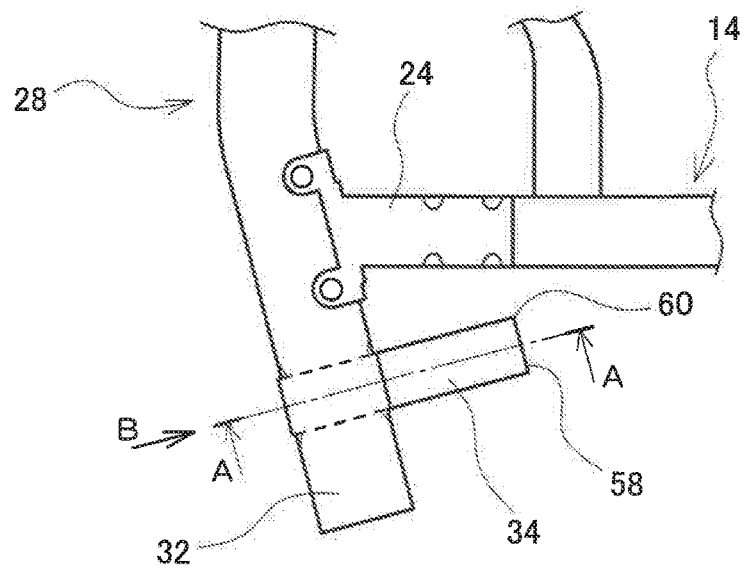
FIG. 2 is an enlarged plan view of a front left portion of the front body structure.
Figure 3:
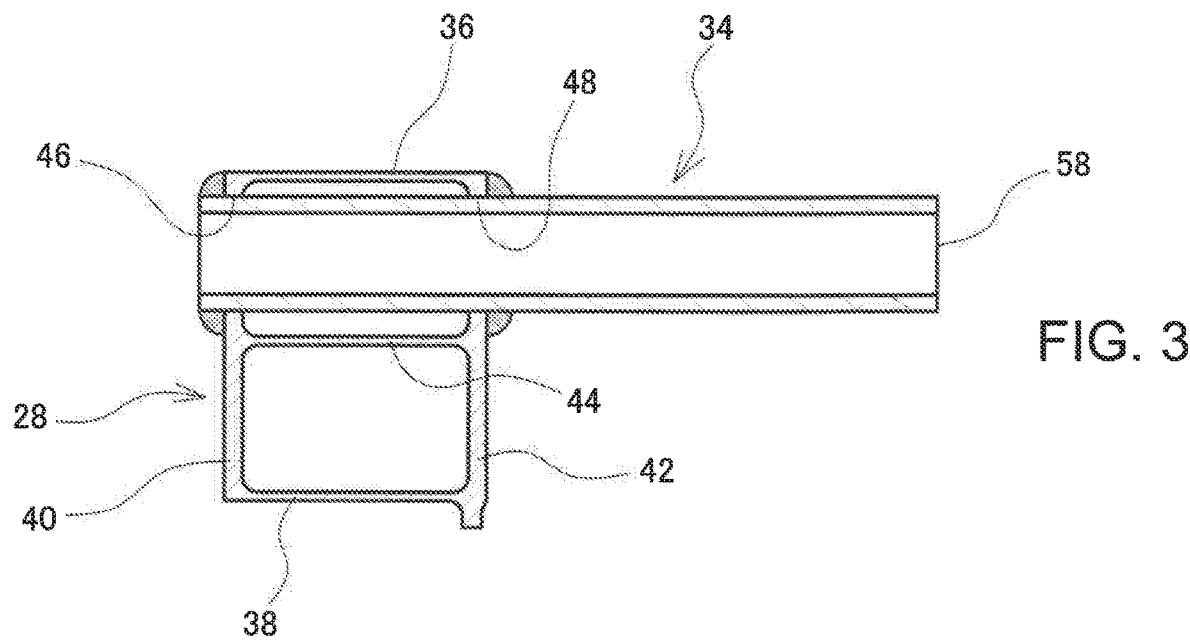
FIG. 3 is a cross sectional view of a bumper reinforcement and a load transmission member taken along line A-A in FIG. 2.
Figure 4:
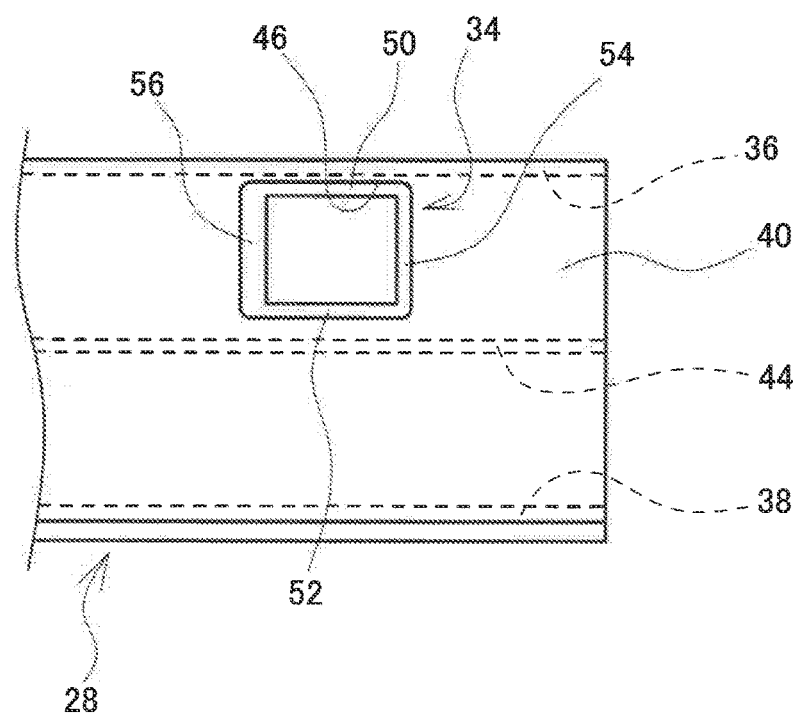
FIG. 4 is a diagram of the bumper reinforcement and the load transmission member viewed along arrow B in FIG. 2.

FIG. 2 is an enlarged view of the front left portion of the front body structure 10. The front right portion has a symmetrical configuration. FIG. 3 is a cross sectional view taken along line A-A in FIG. 2, and FIG. 4 is a diagram viewed along arrow B in FIG. 2.

The bumper reinforcement 28 has a hollow quadrilateral cross section, and includes and upper wall 36 corresponding to the upper side of the quadrilateral cross section, a lower wall 38 corresponding to the lower side, a front wall 40 corresponding to a side located forward of the vehicle, and a rear wall 42 corresponding to a side located rearward of the vehicle. The quadrilateral shape of the cross section of the bumper reinforcement 28 may be a rectangle, for example; in this case, the upper wall 36 and the lower wall 38 may be disposed horizontally, and the front wall 40 and the rear wall 42 may be disposed vertically. The bumper reinforcement 28 further includes a reinforcing wall 44 between the upper wall 36 and the lower wall 38 to connect the front wall 40 and the rear wall 42. The reinforcing wall 44 may be disposed along the entire length of the bumper reinforcement 28. The reinforcing wall 44 may further be disposed horizontally. The reinforcing wall 44 is disposed to secure necessary strength and rigidity of the bumper reinforcement 28; more than one reinforcing wall 44 may be disposed, or no reinforcing walls 44 may be disposed if the bumper reinforcement 28 has sufficient strength. The front wall 40 and the rear wall 42 include openings 46 and 48, respectively, for receiving the load transmission member 34 at locations between the upper wall 36 and the reinforcing wall 44. The bumper reinforcement 28 is made of metal, such as aluminum alloy. The bumper reinforcement 28 made of aluminum alloy, for example, which is suitable for extruding, may be produced by extruding.

The load transmission member 34 has a square tube shape having a hollow quadrilateral cross section, and has an upper wall 50 corresponding to an upper side of the quadrilateral cross section, a lower wall 52 corresponding to the lower side, an outer wall 54 corresponding to a side located outward of the vehicle, and an inner wall 56 corresponding to a side located inward of the vehicle. The quadrilateral shape of the cross section of the load transmission member 34 may be a rectangle; in this case, the upper wall 50 and the lower wall 52 may be disposed horizontally and the outer wall 54 and the inner wall 56 may be disposed vertically. The walls 50, 52, 54, and 56 may have the same thickness or different thicknesses. Specifically, the inner wall 56 may have a greater thickness than other walls, which is 1.3 times or more, or 1.5 times the thicknesses of other walls. The load transmission member 34 is made of metal, such as aluminum alloy. The load transmission member 34 made of aluminum alloy, for example, which is suitable for extruding, may be produced by extruding.

The load transmission member 34 is disposed through the side extension part 32 of the bumper reinforcement 28 and is coupled to the side extension part 32. The load transmission member 34 extends from the front surface of the side extension part 32 through the side extension part 32 and further extends rearward and inward of the vehicle so as to be inclined toward the center line of the vehicle. The load transmission member 34 has a straight line shape. In the front body structure 10 of this embodiment, the load transmission member 34 extends through the bumper reinforcement 28 between the upper wall 36 and the reinforcing wall 44. The position of the load transmission member 34 with respect to the bumper reinforcement 28 may be changed in accordance with the deformation type of the front body structure in a crash. The load transmission member 34 may be disposed at other positions, such as between the reinforcing wall 44 and the lower wall 38. The load transmission member 34 may further be disposed between two adjacent reinforcing walls of a plurality of reinforcing walls. The positions of the openings in the front wall 40 and the rear wall 42 of the bumper reinforcement 28 are determined in accordance with the position of the load transmission member 34 disposed in the bumper reinforcement 28. The load transmission member 34 disposed between adjacent walls of the bumper reinforcement 28 allows the reinforcing wall 44 to be maintained in the bumper reinforcement 28. This structure further prevents a decrease in the strength and rigidity of the bumper reinforcement 28 as compared to a structure in which a part of the reinforcing wall 44 needs to be removed for coupling the load transmission member 34.

The load transmission member 34 is joined to the front wall 40 and the rear wall 42 of the bumper reinforcement 28. When both the load transmission member 34 and the bumper reinforcement 28 are made of metal, arc welding is performed along the openings 46 and 48 formed in the front wall 40 and the rear wall 42, respectively, to join the load transmission member 34 with the bumper reinforcement 28. Welding may be performed along the entire circumferences of the openings 46 and 48, or along a part of the circumferences, such as only along an upper side or a lower side.

The upper wall 50 of the load transmission member 34 and the upper wall 36 of the bumper reinforcement 28 are disposed in parallel to and adjacent to each other. Alternatively or additionally, the lower wall 52 of the load transmission member 34 and the reinforcing wall 44 of the bumper reinforcement 28 are disposed in parallel to and adjacent to each other. In another example in which the load transmission member 34 is disposed between the reinforcing wall 44 of the bumper reinforcement 28 and the lower wall 38, the upper wall 50 of the load transmission member 34 and the reinforcing wall 44 of the bumper reinforcement 28 are disposed in parallel to and adjacent to each other, and the lower wall 52 of the load transmission member 34 and the lower wall 38 of the bumper reinforcement 28 are disposed in parallel to and adjacent to each other. When the load transmission member 34 is disposed between two reinforcing walls 44, the upper wall 50 and the lower wall 52 of the load transmission member 34 are respectively disposed in parallel to and adjacent to the corresponding reinforcing walls 44. Joining the load transmission member 34 to the bumper reinforcement 28 at portions in the front wall 40 and the rear wall 42 near the upper wall 36, the lower wall 38, and the reinforcing wall 44, where deformation of the bumper reinforcement 28 caused by a crash is smaller than in portions of the bumper reinforcement 28 remote from these walls, reliably maintains the joined state in a crash. The walls of the bumper reinforcement 28 located adjacent to the load transmission member 34 above and below the load transmission member 34 restrict the upward-downward movement of the load transmission member 34 to thereby regulate a relative motion between the load transmission member 34 and the bumper reinforcement 28.

The rear end of the load transmission member 34 is spaced from the side rail 14. The rear end face 58 of the load transmission member 34 is disposed such that a plane defined by this rear end face 58 intersects the side rail 14. In this embodiment, the rear end face 58 of the load transmission member 34 is orthogonal to the center line of the load transmission member 34 having a square tube shape. An inner side edge 60 of the rear end face 58 toward inward of the vehicle forms a corner opposite a side face of the side rail 14. This corner may be chamfered to form a round corner.

FIG. 5 schematically illustrates deformation of the front body structure 10 in a small overlap crash, especially in a small overlap crash test. A small overlap crash is a type of a crash in which an object collides against an outward portion of the vehicle having a length corresponding to one-fourth of the vehicle width. In the crash test, a vehicle is caused to collide with a small overlap barrier 62 (hereinafter referred to as a barrier 62); as the barrier 62 hits the portion of the vehicle located further outward than the side rail 14, the collision load may not be sufficiently imposed on the side rail 14. In the front body structure 10 of the present embodiment, in contrast, the load transmission member 34 extending through the bumper reinforcement 28 transmits the collision load to the side rail 14.

In a small overlap crash, the barrier 62 collides against the side extension part 32 of the bumper reinforcement 28. The collision load generated is transmitted to the crush box 24 of the side rail 14 to collapse the crush box 24. Simultaneously, the bumper reinforcement 28 is bent to move rearward, so that the rear end of the load transmission member 34 moves inward of the vehicle while facing inward of the vehicle. This movement of the load transmission member 34 brings the inner side edge 60 of the rear end face into contact with the side rail 14, thereby transmitting the collision load to the side rail 14. Consequently, the side rail 14 is bent inward of the vehicle to absorb the collision energy. At this time, the load transmission member 34, which transmits the collision load directly to the side rail 14, efficiently causes the side rail 14 to be bent. Further, the load transmission member 34 supports the side extension part 32 of the bumper reinforcement 28, to thereby prevent further intrusion of the barrier 62.

Should the load transmission member 34 not extend through the bumper reinforcement 28 and extend rearward from the rear wall 42, the collision load generated when the rear end face 58 of the load transmission member 34 hits against the side rail 14 would collapse the bumper reinforcement 28, which may prevent the collision load from being sufficiently transmitted to the side rail 14. Further, collapse of the bumper reinforcement 28 would change the orientation of the load transmission member 34, to thereby prevent deformation of the side rail 14. In the front body structure 10 of the present embodiment, in contrast, the load transmission member 34 is disposed through the bumper reinforcement 28 to efficiently transmit the collision load to the side rail 14 and to cause the side rail 14 to be bent sufficiently. Further, the rear end of the load transmission member 34, which is held by the bent portion of the side rail 14, efficiently supports the side extension part of the bumper reinforcement 28.

While in the above embodiment, a vehicle with a ladder frame has been described, the present disclosure may be applied to a vehicle with a monocoque body. In this case, the front side members in the ladder frame structure correspond to the side frame members.

REFERENCE SIGNS LIST

10 front body structure, 12 ladder frame, 14 (14L, 14R) side rail (side frame member), 16, 18, 20 cross member, 24 (24L, 24R) crush box, 28 bumper reinforcement, 30 center part, 32 (32L, 32R) side extension part, 34 (34L, 34R) load transmission member, 36 upper wall, 38 lower wall, 40 front wall, 42 rear wall, 44 reinforcing wall, 46, 48 opening, 50 upper wall, 52 lower wall, 54 outer wall, 56 inner wall, 58 rear end face of load transmission member, 60 side edge of rear end face, 62 small overlap barrier.

The invention claimed is:

1. A front body structure of a vehicle, comprising:
   a pair of side frame members extending in a forward-rearward direction of the vehicle on right and left sides in a front portion of the vehicle, respectively;
   a hollow bumper reinforcement extending in a right-left direction of the vehicle and coupled to front ends of the pair of side frame members, the bumper reinforcement including side extension parts extending outward beyond the pair of side frame members, respectively; and
   load transmission members extending from front faces of the respective side extension parts of the bumper reinforcement through the side extension parts and further extending rearward and inward of the vehicle, wherein
   the bumper reinforcement includes an upper wall, a lower wall, a front wall, and a rear wall forming a hollow quadrilateral cross section, the bumper reinforcement further including at least one reinforcing wall disposed between the upper wall and the lower wall and connecting the front wall and the rear wall, and
   each of the load transmission members is disposed between two adjacent walls among the upper wall, the lower wall, and the at least one reinforcing wall of the bumper reinforcement.

2. The front body structure of a vehicle according to claim 1, wherein
   each of the load transmission members is a hollow member including an upper wall and a lower wall, the upper wall and the lower wall of the load transmission member being respectively disposed in parallel to and adjacent to corresponding ones of the adjacent walls of the bumper reinforcement.

3. The front body structure of a vehicle according to claim 2, wherein
   the bumper reinforcement and the load transmission members are made of metal, and at least the upper wall and the lower wall of each load transmission member are welded to the bumper reinforcement in the front face and a rear face of the bumper reinforcement.

4. The front body structure of a vehicle according to claim 1, wherein
   each load transmission member includes a rear end spaced from a corresponding one of the side frame members, and in a small overlap crash, the rear end of the each load transmission member comes into contact with the side frame member, so that the load transmission member transmits a load input to a corresponding one of the side extension parts of the bumper reinforcement to the side frame member.

* * * * *